(12) United States Patent  
Yap et al.

(10) Patent No.: US 7,164,844 B1
(45) Date of Patent: Jan. 16, 2007

(54) METHOD AND APPARATUS FOR FACILITATING REVERSE PLAYBACK

(75) Inventors: Adrian Yap, Gaithersburg, MD (US); Scott Casavant, Germantown, MD (US)

(73) Assignee: The DirecTV Group, Inc., El Segundo, CA (US)

( * ) Notice: Subject to any disclaimer, the term of this patent is extended or adjusted under 35 U.S.C. 154(b) by 899 days.

(21) Appl. No.: 09/666,257

(22) Filed: Sep. 21, 2000

Related U.S. Application Data

(60) Provisional application No. 60/186,548, filed on Mar. 2, 2000, provisional application No. 60/199,438, filed on Apr. 25, 2000.

(51) Int. Cl.
    *H04N 5/91* (2006.01)
(52) U.S. Cl. .......................... 386/68; 386/111
(58) Field of Classification Search ................. 386/68, 386/69, 70, 125–126, 111; 725/151, 152, 725/153
    See application file for complete search history.

(56) References Cited

U.S. PATENT DOCUMENTS

| | | | | |
|---|---|---|---|---|
| 5,539,466 A | * | 7/1996 | Igarashi et al. | 375/240.15 |
| 5,799,129 A | * | 8/1998 | Muto | 386/68 |
| 5,857,083 A | * | 1/1999 | Venkat | 710/314 |
| 5,959,659 A | * | 9/1999 | Dokic | 725/152 |
| 6,369,855 B1 | * | 4/2002 | Chauvel et al. | 370/474 |
| 6,754,274 B1 | * | 6/2004 | Park | 375/240.25 |

* cited by examiner

*Primary Examiner*—Vincent F. Boccio
(74) *Attorney, Agent, or Firm*—Georgann S. Grunebach

(57) ABSTRACT

A method and apparatus for processing recorded coded audiovisual data to facilitate reverse playback permits the user to play back recorded material in a temporally reversed manner at speeds of at least 1X or greater by storing the decoded frames in a graphics accelerator memory of a recording system. By storing decoded MPEG video frames representing the audiovisual data in the graphics accelerator's memory, it is possible to display all the frames of a group of pictures GOP in reverse order. Instead of using the memory of a graphics accelerator, the apparatus may also be configured to have sufficient space available in memory to store the decoded MPEG video frames. In either configuration, reverse playback may be effectuated with a much finer temporal granularity than what is currently achievable by conventional video recording apparatuses.

24 Claims, 8 Drawing Sheets

METHOD AND APPARATUS FOR FACILITATING REVERSE PLAYBACK

This application claims the benefit under 35 U.S.C. Section 119(e) of a U.S. Provisional application by Adrian Yap et al. entitled "MPEG FRAMES MANAGEMENT FOR REVERSE PLAYBACK", Ser. No. 60/186,548, filed on Mar. 2, 2000; and of a U.S. Provisional application by Adrian Yap et al. entitled "DIGITAL VIDEO RECORDER", Ser. No. 60/199,438, filed on Apr. 25, 2000, the entire contents of each application being incorporated by reference herein.

BACKGROUND OF THE INVENTION

1. Technical Field of the Invention

This invention generally relates to digital recording, playing, and playback of previously recorded audiovisual (A/V) signals. This invention more particularly relates to a method for playing back MPEG video frames in reverse order such that video frames in a group of pictures (GOP) are played back with finer temporal granularity.

2. Description of Related Art

Conventional devices exist for recording broadcast audiovisual signals. Particularly, various digital VCRs are known that record an off-air broadcast and later playback the previously recorded program.

While digital VCRs have an advantage over analog VCRs because the playback is of the same digital quality as the real-time broadcast, such conventional digital VCRs also have certain disadvantages. Among these disadvantages is that, due to current storage limitations, reverse playback of MPEG video frames is typically limited to viewing the I frames (the anchor frames or interframes) of a GOP.

A typical GOP may contain one I-frame in 15 frames of video. As a consequence, each I-frame is used to represent about 0.5 seconds of video. Thus for a 1x speed reverse playback, the same video image would be displayed for 0.5 second (i.e. the single I-frame is repeated for 15 frame times).

For example, in conventional systems that offer reverse playback features, a typical GOP may include I, P and B frames in some order, such as I B B P B B P B B P B B P B B. These frames are actually different pictures of a subject image, hence group of pictures or GOP. The P-frames are single directional predictive frames which are dependent on the I frame (i.e., the P frames typically show changes in the basic overall image, like cloud cover changes in an image of a city skyline, for example). The B frames are bidirectional frames which provide for high compression (they have the highest compression ratio in the GOP).

The problem during reverse playback of GOPs on conventional systems is that large portions of recorded image data (e.g., the P and B-frames in the GOP) are skipped or omitted in the playback. Particularly, only the I-frames are played back. This is due to the fact that there are not enough frame times to decode the number of frames needed to display all the image data in a GOP.

For example, take a recorded broadcast such as a football game. The viewer has just seen a successful field-goal attempt split the uprights. He now wants to replay it again, and selects the reverse playback option on his remote. With conventional systems, as the video is being reversed, the viewer might see the ball go through the uprights in one displayed segment (frame), in mid-flight in the next displayed segment, and then maybe at the point of impact with the kicker's foot in the next reverse displayed video segment. Since only the I-frames are being played back in reverse, a substantial part of the video footage is omitted.

Moreover, suppose the sequence of I and P-frames to be displayed in reverse are as follows: $I_n$, $P_{n+1}$, $P_{n+2}$, $P_{n+3}$ and $P_{n+4}$ (in storage and decode order). To display these frames in reverse order, the viewer would be presented with $P_{n+4}$, $P_{n+3}$, $P_{n+2}$, $P_{n+1}$ and $I_n$. Due to the predictive nature of MPEG compression, at least 4 frames (namely $I_n$, $P_{n+1}$, $P_{n+2}$, $P_{n+3}$) must be decoded and stored in order to decode and display the first frame to be displayed ($P_{n+4}$). Further, a 1x reverse playback of I and P-frames means that each frame will be displayed for 3 frame times (since the two intermediate B-frames are not decoded or displayed). Therefore, each time that the last frame in a GOP is desired to be displayed, 5 decodes must take place.

Given that MPEG decoders typically decode one frame in one frame time (1/30 second), it is impossible to decode 5 frames in 3 frame times. Accordingly, this means that a typical decoder can only decode 3 frames, namely $I_n$, $P_{n+1}$ and $P_{n+2}$ in 3 frame times. As mentioned above, $P_{n+3}$ and $P_{n+4}$ are also required to be decoded in order to display $P_{n+4}$. Hence, it is impossible to display I and P-frames at 1x reverse playback—since only the I-frames can be displayed at 1x reverse playback with existing MPEG architectures. This is an undesirable situation because each I-frame in a GOP represents about 0.5 second of video. As a consequence, the reverse playback is very jerky and annoying to the human eye.

Therefore, what is desired is a method and apparatus for performing reverse playback of previously recorded audiovisual (A/V) signals, which addresses the aforementioned drawbacks, and which is able to display I, P and B-frames of a GOP in reverse playback at speeds of at least 1x or greater.

SUMMARY OF THE INVENTION

The present invention provides a method and apparatus for recording and for processing the recorded coded MPEG video frames to facilitate reverse playback. The method may be useful with DVR applications that have recently entered the market. One feature permits the user to play back recorded material in a temporally reversed manner at speeds of at least 1X or greater by storing the decoded frames in a graphics accelerator memory.

More particularly, the present invention may utilize a bus to interconnect a host processor, transport processor, decoder, memory device, graphics accelerator and hard disc drive (HDD). Audiovisual (A/V) data is received by the transport processor and routed to both the memory device and the decoder in a parallel fashion. The host processor then moves the A/V data from the memory device to the HDD for recording. The decoder decodes the received A/V data and sends the decoded data to the graphics processor for graphics processing and then NTSC encoding, with the encoded A/V data being outputted to a display device such as a television, computer monitor, etc. By storing decoded MPEG video frames in the graphics accelerator's memory, it is possible to display all the frames of the GOP in reverse order without further additional hardware.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
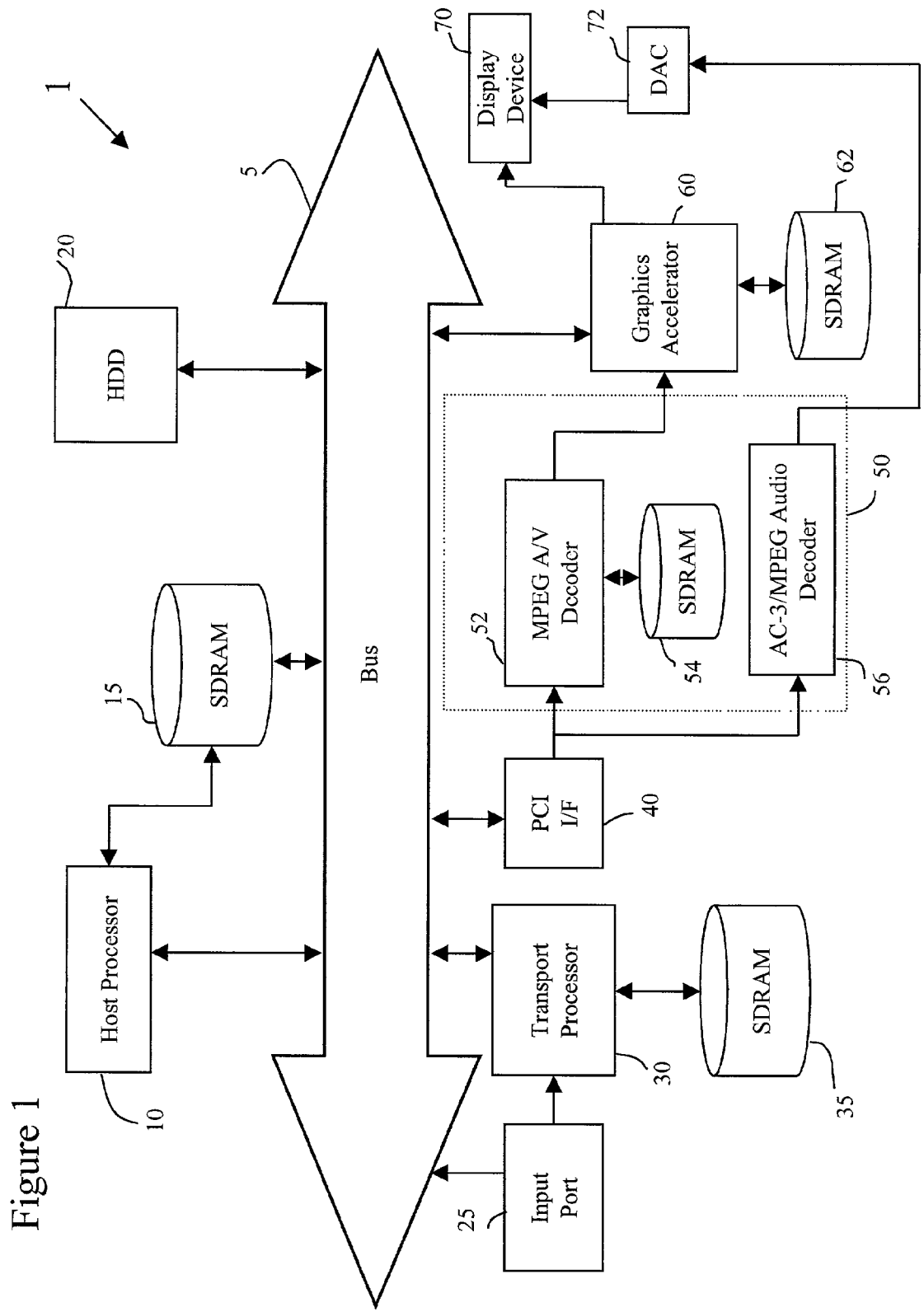
FIG. 1 is a block diagram of a system capable of performing reverse playback according to an exemplary embodiment of the invention.

FIG. 1 illustrates an apparatus 1 that is capable of performing reverse playback as further described below. The apparatus 1 utilizes a bus 5 to interconnect various components and to provide a pathway for data and control signals.

In particular, FIG. 1 illustrates a host processor 10, a memory device 15 (in an exemplary configuration embodied as an SDRAM 15) and hard disc drive (HDD) 20 connected to the bus 5. The host processor 10 may also have a direct connection to SDRAM 15 as shown in FIG. 1.

As further shown in FIG. 1, a transport processor 30 and PCI I/F 40 (peripheral component interconnect interface) are connected to the bus 5. The transport processor 30 also has a connection to input port 25 and SDRAM 35. Furthermore, the PCI I/F 40 is connected to a decoder 50. The decoder 50 is connected to a graphics accelerator 60 (hereinafter GA 60), with GA 60 being connected to its associated SDRAM 62. The output of GA 60 is in turn sent to a display device 70. As is also seen in FIG. 1, decoder 50 includes both an MPEG A/V decoder 52 and an AC-3/MPEG audio decoder 56, the output of the latter being sent to display device 70 after conversion in digital-to-analog converter (DAC) 72.

The host processor 10 may be constructed with conventional microprocessors such as the currently available Pentium™ processors from Intel. Host processor 10 performs non real-time functions in the apparatus 1, such as graphics-user interface and browser functions.

HDD 20 is actually a specific example of a mass storage device. In other words, the HDD 20 may be replaced with other mass storage devices as is generally known in the art, such as known magnetic and/or optical storage devices, (i.e., embodied as RAM, a recordable CD, a flash card, memory stick, etc.). In an exemplary configuration, HDD 20 may have a capacity of about 20 Gbytes (GB), where preferably about 16 GB is available for various recording applications and the remainder flexibly allocated for pause applications in the apparatus 1.

The bus 5 may be implemented with conventional bus architectures such as the peripheral component interconnect (PCI) bus that is standard in many computer architectures. Alternative bus architectures could, of course, be utilized to implement bus 5.

The transport processor 30 performs real-time functions and operations such as control of the A/V data flow, conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 30 may integrate system peripherals such as interrupt, timer, and memory controllers on-chip, including ROM, SDRAM, DMA controllers; a packet processor, crypto-logic, PCI compliant PC port, and parallel inputs and outputs. The implementation shown in FIG. 1 actually shows the SDRAM 35 as being separate from the transport processor 30, it being understood that the SDRAM 35 may be dispensed with altogether or consolidated with SDRAM 15. In other words, the SDRAMs 15 and 35 need not be separate devices and can be consolidated into a single SDRAM or other memory device.

The input port 25 receives audiovisual bitstreams that may include, for example, MPEG-1 and MPEG-2 video bitstreams, MPEG-1 layer 11 audio bitstreams and Dolby digital (AC-3) audio bitstreams. Exemplary A/V bitrates may range from about 60 Kbps to 15 Mbps for MPEG video, from about 56–384 Kbps for MPEG audio, and between about 32–448 Kbps for AC-3 audio. The single-stream maximum bitrate for apparatus 1 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 448 kbps.

Of course, various other audiovisual bitstream formats and encodation techniques may be utilized in recording; for example, the apparatus 1 may record an AC-3 bitstream, if AC-3 broadcast is present, along with MPEG-1 digital audio. Still further, the received audiovisual data may be encrypted and encoded or not encrypted and encoded. If the audiovisual data input via the input port 25 to the transport processor 30 is encrypted, then the transfer processor 30 may perform decryption. Moreover, the decryption may be performed instead by the host processor 10.

Alternatively, the host processor 10 and transport processor 30 may be integrated or otherwise replaced with a single processor. As mentioned above, the SDRAMs (15 and 35) may be consolidated or replaced with a single SDRAM or single memory device.

The PCI I/F 40 may be constructed with an ASIC that controls data reads from memory. Audiovisual (A/V) data may be sent to the host processor 10's memory while simultaneously being sent to an MPEG A/V decoder 52, as further discussed below.

As previously noted, decoder 50 may be constructed as shown in FIG. 1 by including the MPEG A/V decoder 52 connected to the PCI I/F 40, as well as an AC-3/MPEG audio decoder 56 which is also connected to the PCI I/F 40. In this way, the video and audio bitstreams from the PCI I/F 40 can be separately decoded by decoders 52 and 56, respectively.

Alternatively, a consolidated decoder may be utilized that decodes both video and audio bitstreams together. As mentioned above, the encodation techniques are not limited to MPEG and AC-3 and can include any known or future developed encodation technique. In a corresponding manner, the decoder 50 could be constructed to process the selected encodation technique(s) utilized by the particular implementation desired.

In order to more efficiently decode the MPEG bitstream, the MPEG A/V decoder 52 may also include a memory device such as SDRAM 54 connected thereto. This SDRAM 54 may be eliminated, consolidated with decoder 52 or consolidated with the other SDRAMs 15 and/or 35.

GA 60 includes processing circuitry for performing graphics processing of a decoded input video stream, and encoding circuitry for encoding and converting the processed video to analog prior to outputting it to display device 70. GA 60 also includes a memory interface which communicates with SDRAM 62 in order to direct the incoming video bit stream to a specific storage location in SDRAM 62, and also selects the frames and frame order for display. This is discussed in further detail below with reference to FIG. 3. Display device 70 may be an analog or digital output device capable of handling a digital, decoded output from the GA 60. If analog output device(s) are desired, and to listen to the output of the AC3/MPEG audio decoder 56, a digital-to-analog converter (DAC) 72 is connected to the decoder 50. The output from DAC 72 is an analog sound output to display device 70, which may be a conventional television, computer monitor screen, portable display device or other display devices which are known and used in the art. If the output of the AC3/MPEG audio decoder 56 is to be decoded by an external audio component, a digital audio output interface (not shown) may be included between the AC3/MPEG audio decoder 56 and display device 70. The interface may be a standard interface known in the art such as a SPDIF audio output interface, for example, and may be used with, or in place of DAC 72, depending on whether the output devices are analog and/or digital display devices.

Figure 2:
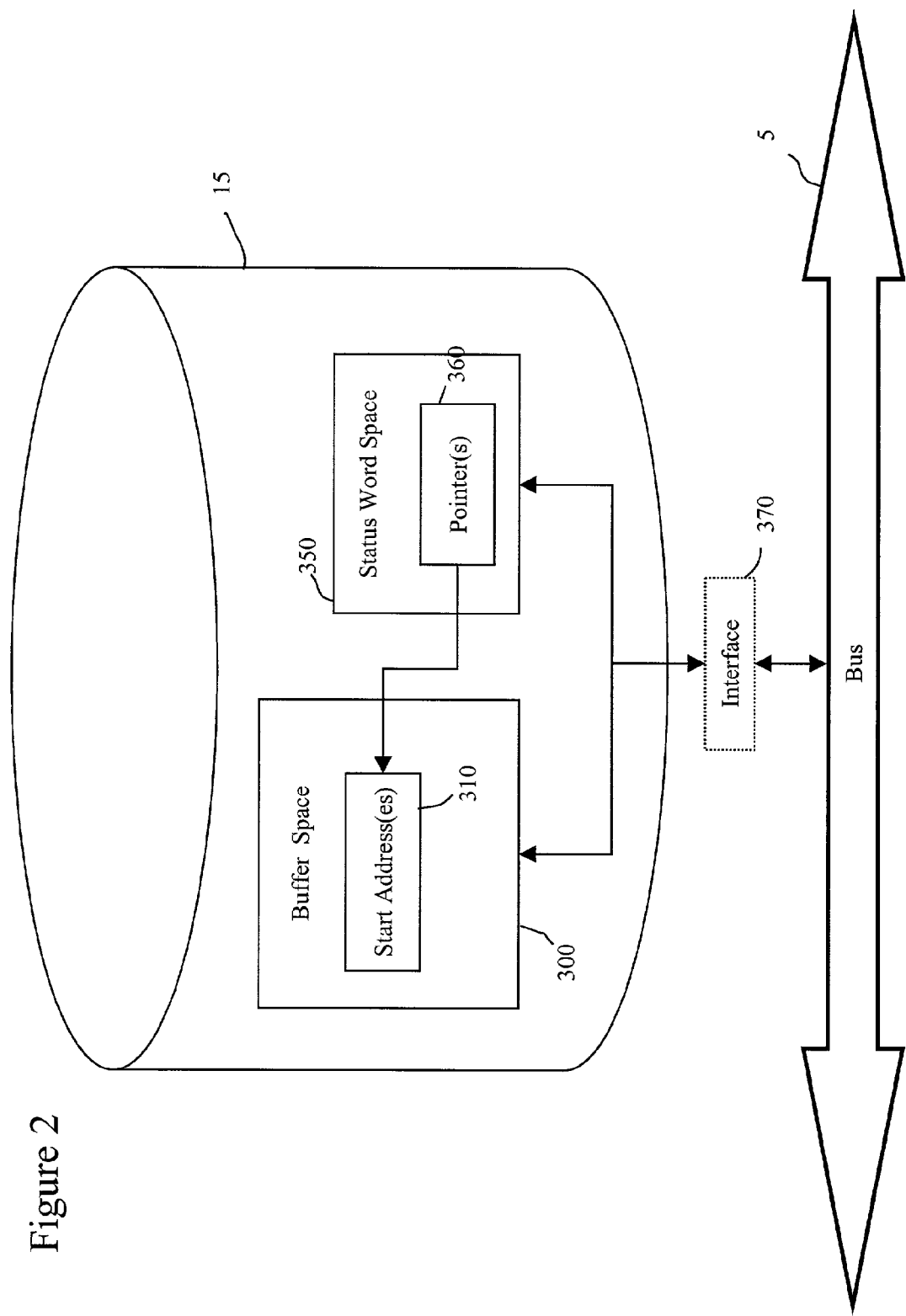
FIG. 2 is a block diagram showing an exemplary construction of the memory device according to an exemplary embodiment of the invention.

FIG. 2 illustrates various components that may be provided for the SDRAM 15. As mentioned above, the SDRAM shown in FIG. 1 is actually a specific implementation of a memory device. It is noted that the invention is not limited to this specific implementation of SDRAM 15 and can include any other known or future developed memory technology. Regardless of the technology selected, the memory device 15 may include a buffer space 300 which may be a fixed or virtual set of memory locations that buffers or otherwise temporarily stores audiovisual data. In practice, the video data may be stored separate from the audio data, but is would be possible to intermix these data types depending upon the particular application and coding techniques utilized for the audio and visual data.

The audio visual data stored in the buffer space 300 includes one or more start addresses 310 which indicate the beginning memory address at which the audio and/or video data (A/V) is stored. If the A/V data is separately stored, then a plurality of stored addresses will be necessary. Furthermore, if there are more than one set of, or a block of data within the buffer space 300, then the start addresses 310 will individually point to each block of data.

The memory device 15 also includes a status word space 350. This status word space includes fixed or virtual addresses at which status words may be stored. An example of a status word that may be stored in the status word space 350 is a status word summarizing the status of a peripheral device. For example, the status word that may be stored within the status word space 350 may include the status of the host processor 10 or transport processor 30. The status word space 350 may also include pointers 360 that point to the start addresses 310 within the buffer space 300.

As further shown in FIG. 2, the SDRAM 15 may connect to the bus 5 via an interface 370. The dash lines indicate that the interface 370 is optional and may or may not be included depending upon the interface requirements of the particular memory device 15 and/or bus 5.

Figure 3:
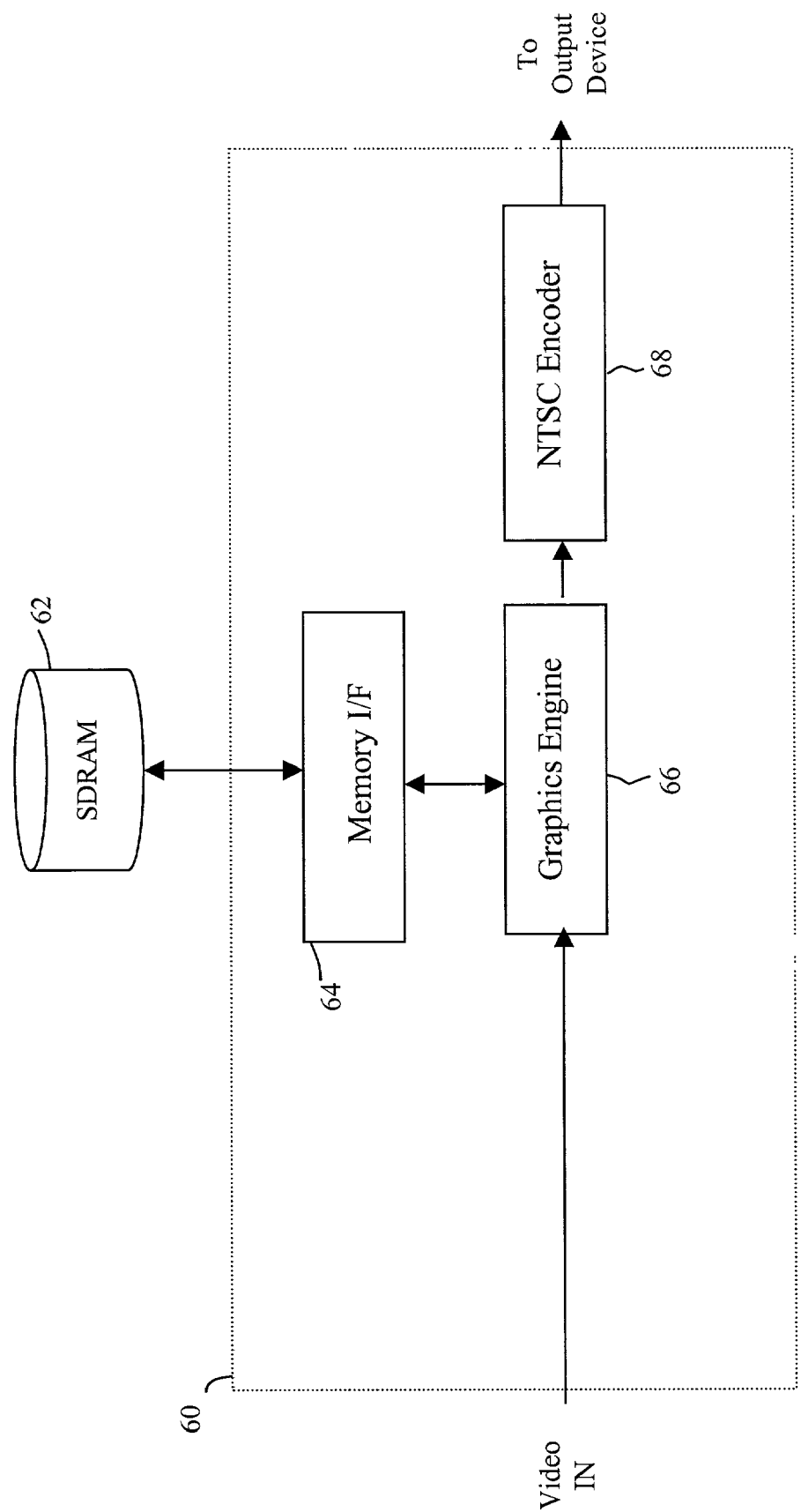
FIG. 3 is a block diagram showing an exemplary construction of the graphics accelerator according to an exemplary embodiment of the invention.

FIG. 3 is a block diagram showing an exemplary construction of the graphics accelerator according to the invention. The GA 60 preferably is a graphics chip which includes a memory interface (I/F) 64 to SDRAM 62, a graphics engine 66 and an encoder 68. The memory interface 64 and encoder 68 are shown embedded in GA 60; however, these components may be separate or external from GA 60.

Memory I/F 64 is preferably an industry standard SDRAM interface, but may also be one of a PCI bus, RAM bus, DDR (double data rate) and EDO RAM (Extended Data Output DRAM) interface which is used in the art. Memory I/F 64 controls access to a display memory portion in SDRAM 62. In particular, memory interface 64 informs the incoming video frame where it is to be stored in SDRAM 62. Additionally, memory I/F 64 selects the decoded frames (which are being stored in SDRAM 62) that are going to be displayed on display device 70 when reverse playback is initiated by the viewer.

Graphics engine 66 may preferably be a 64-bit DRAM based XVGA controller with hardware accelerated BitBLT (bit block transfer), video playback and video capture to a frame buffer (SDRAM 62 for example). However, graphics engine 66 should not be limited to this specific implementation. In other words, the graphic engine 66 may be implemented with other controller technologies.

Encoder 68 is preferably an NTSC encoder that encodes, or converts the digital video output from graphics engine 66 into a coded analog signal for display. Regarding the specifications of the NTSC (National Television Standards Committee) encoder 68, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. The SECAM standard was introduced in the early 1960's and implemented in France. SECAM uses the same bandwidth as PAL but transmits the color information sequentially. SECAM runs on 625 lines/frame.

Thus, although use of NTSC encoder 68 is envisioned to encode the processed video for display on display device 70, the present invention is not limited to this standard encoder. PAL and SECAM encoders may also be utilized. Further, developing HDTV encoders may also be viable to encode the processed video for display on a HDTV, for example.

SDRAM 62 is similar in its construction to SDRAM 15, described in FIG. 2. SDRAM 62 provides the extra frame buffers (sufficient memory, preferably at least 2 Mbyte or greater) necessary to temporarily store the decoded frames of the GOP such that they may be temporally reversed in GA 60 prior to being output for display on display device 70.

As seen in FIG. 3, the decoded video is input into graphics engine 66, whereby it is subject to graphics processing to prepare the image frames for system to display transfer. It is noted that the frames are input in what can be termed as a temporally correct order (since MPEG decoding is done in the order in which the frames of the GOP are received), where they are directed to SDRAM 62 for temporary storage. As will be pictorially explained below, memory interface 64 instructs SDRAM 62 to output the selected frames for playback to graphics engine 66 in temporally reversed order. Thereafter, the frames of a GOP for display can be encoded and converted to analog at NTSC encoder 68 before being sent to display device 70.

The operation of the invention will now be described in accordance with FIG. 4, whereas FIGS. 6–8 will be referred to in explaining the specific implementation of reverse playback regarding the frame (field) management of successive first and second GOPs.

Figure 4:
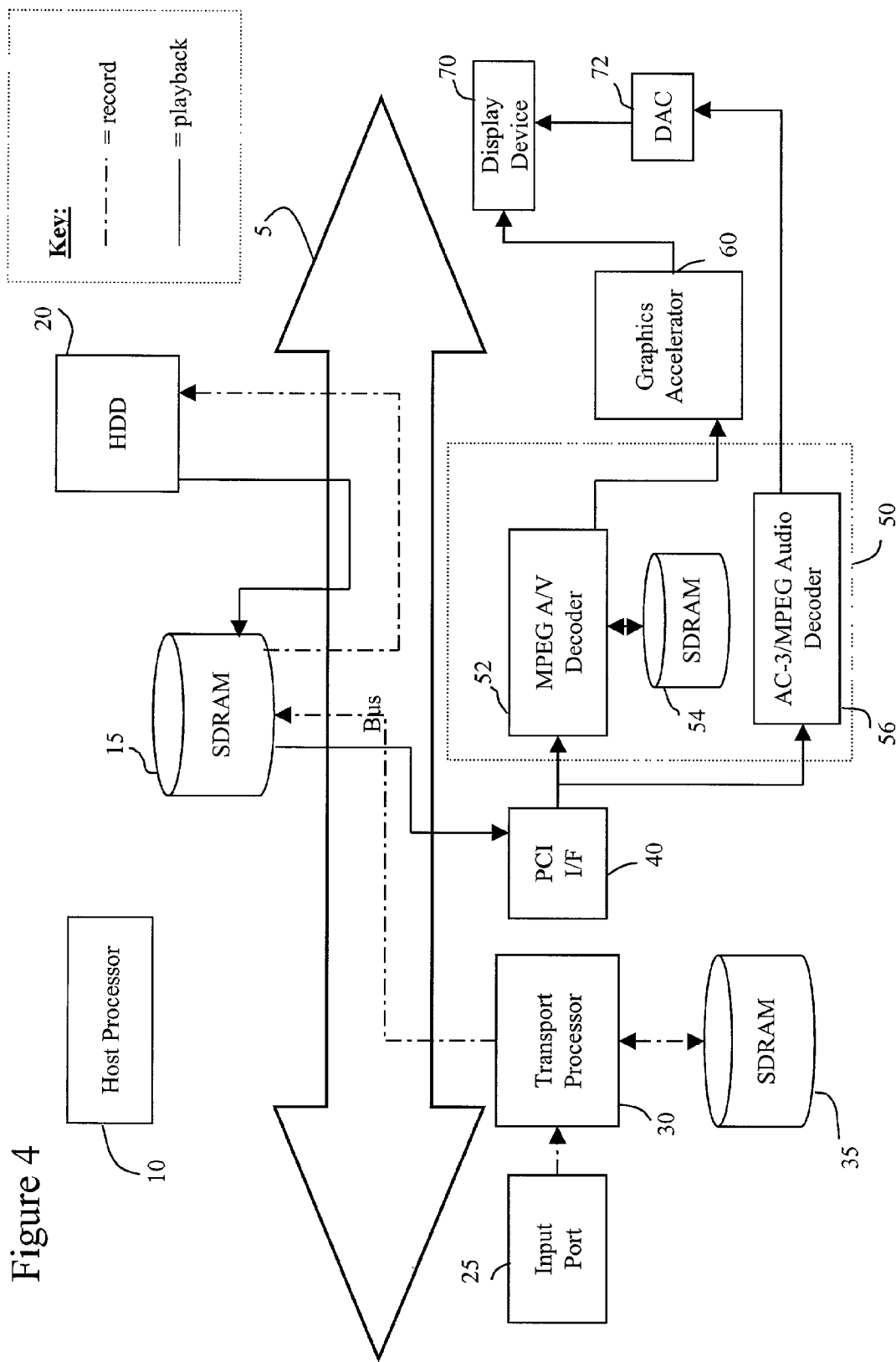
FIG. 4 is a flow diagram showing data flow for record and reverse playback in accordance with an exemplary embodiment of the invention.

FIG. 4 shows the data flow among the various components of the apparatus 1. Some of the connections between components, and associated reference numerals that are shown in FIG. 1 may have been eliminated in FIG. 4 in order to highlight the data flow which is shown using dashed lines (see Key) in FIG. 4.

As shown in FIG. 4, audiovisual data is fed from the input port 25 to the transport processor 30. The transport processor 30 then transfers the received audiovisual data to SDRAM 15. Digital recording is accomplished by the host processor 10, which transfers the audiovisual data buffered by SDRAM 15 to the HDD 20. In other words, the SDRAM 15 serves as a buffer which buffers data sent by transport processor 30. This allows the host processor 10 to control the recording onto the HDD 20 when host processor 10 time is available. When a sufficient amount of A/V data has been accumulated in the SDRAM 15, the host processor 10 transfers the data from the SDRAM 15 to the HDD 20 for recording therein.

Figure 5:
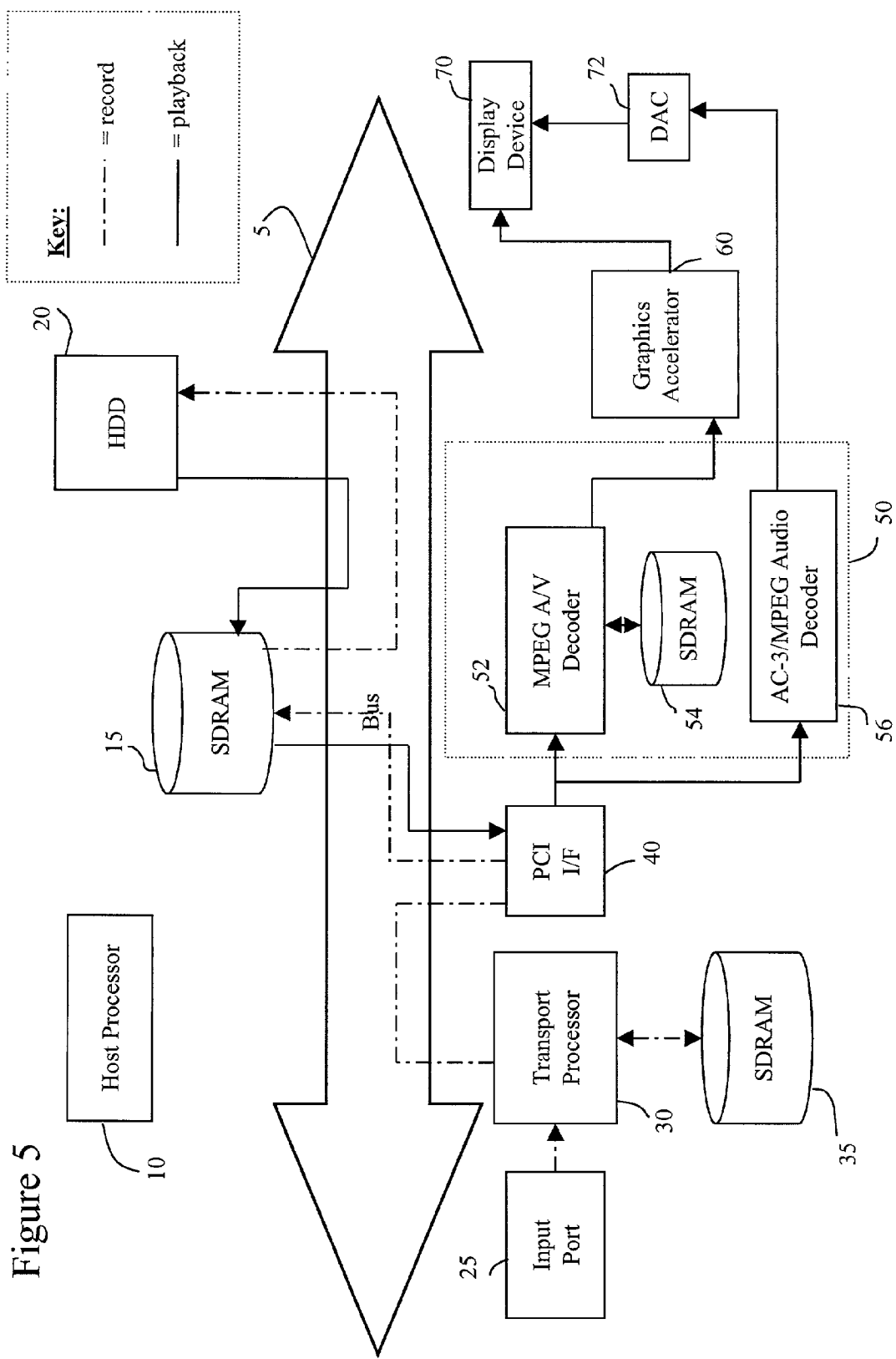
FIG. 5 is a flow diagram showing an alternative signal path for recording.

FIG. 5 illustrates an alternative signal path for record. Audiovisual data is fed from the input port 25 to the transport processor 30. The transport processor 30 then transfers the received audiovisual data to the PCI I/F 40, as indicated by the dashed data flow line. The PCI I/F 40 receives audiovisual data from the transport processor 30 via bus 5, and sends this data to host processor 10, more particularly to SDRAM 15.

Digital recording is accomplished similarly, with SDRAM 15 serving as a buffer which buffers data sent by the PCI I/F 40. This allows the host processor 10 to control the recording onto the HDD 20 when processor time is available. When a sufficient amount of A/V data has been accumulated in the SDRAM 15, the host processor 10 transfers the data from the SDRAM 15 to the HDD 20 for recording therein. To record data, the host processor 10 may also inform the PCI I/F 40 of available start addresses in the SDRAM buffer space 15 to which data may be buffered for eventual recording in HDD 20.

When a user selects reverse playback, the A/V data recorded on HDD 20 (successive GOPS, for example) is sent via bus 5 to a queue in SDRAM 15. Next, the buffered A/V data is sent from SDRAM 15 via bus 5 to PCI I/F 40, which in turn sends the A/V data to decoder 50. More specifically, the video portion of the bitstream is preferably sent to MPEG A/V decoder 52, with the audio portion being sent to AC-3/MPEG audio decoder 56.

The MPEG A/V decoder 52 may be provided with an SDRAM 54 in order to more efficiently decode the MPEG bitstream. SDRAM 54 is similar to SDRAM 15 and SDRAM 62 discussed above in its construction. SDRAM 54 temporarily holds the encoded video bitstream data, and also provides the three frame buffers required for MPEG decoding, whereupon the decoded data (decoded frames or fields of a GOP) is output to GA 60. In conventional digital video recording apparatuses, SDRAMs similar to SDRAM 54, which are used in conjunction with an MPEG decoder, are insufficient memory-wise to perform an adequate reverse playback. As discussed earlier, this is because there are not enough frame buffers (3) for the number of frame times needed for playback (typically in a GOP there are about a total of five (5) I and P frames).

Figure 6:
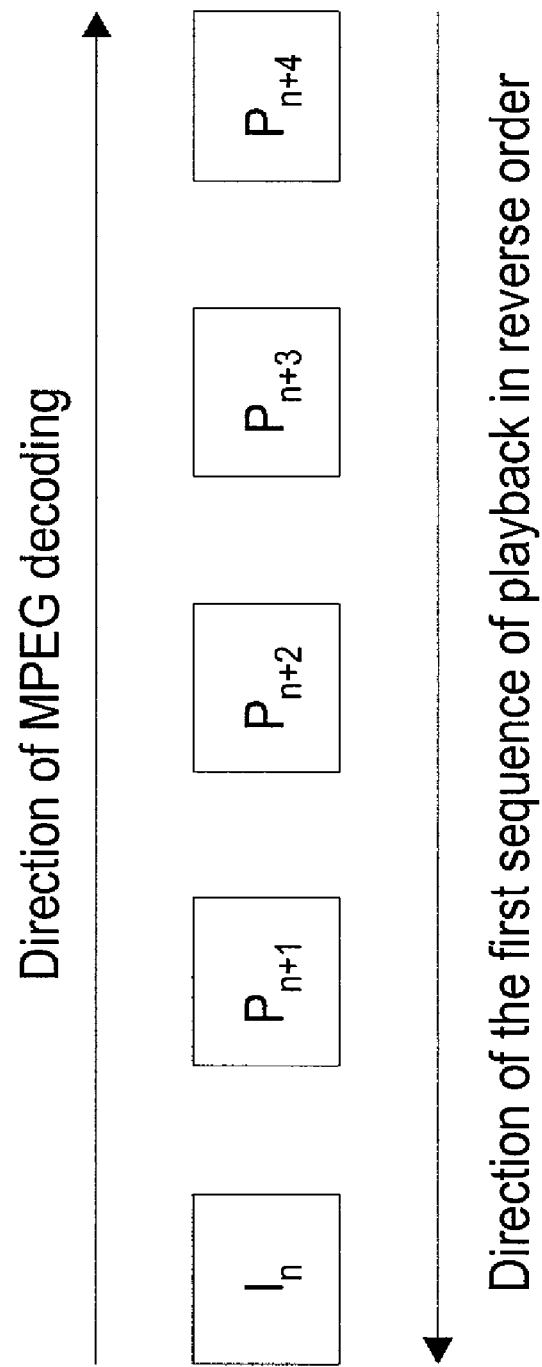
FIG. 6 illustrates the reverse playback field (frame) management for a first GOP according to an exemplary embodiment of the invention.

FIG. 6 illustrates the reverse playback frame (field) management for a first GOP according to the invention. As previously noted, frames $I_n$ $P_{n+1}$ $P_{n+2} P_{n+3}$ $P_{n+4}$ must be decoded and stored in order to display the intended $P_{n+4}$ frame. There exists an inevitable initial delay which corresponds to the amount of time to decode 5 frames ($I_n$ $P_{n+1}$ $P_{n+2}$ $P_{n+3}$ $P_{n+4}$) at the onset of reverse playback. However, once this 5-frame delay is completed upon the commencement of reverse playback, there is no further delay once the reverse playback begins. In general the startup delay during playback can be expressed by $t_{st}=(n_{I+mP})*FT$ (sec), where ($n_I+m_P$) is equal to the number of I and P-frames in a GOP, times the frame time FT, which in an exemplary case is about 1/30 seconds.

Figure 7:
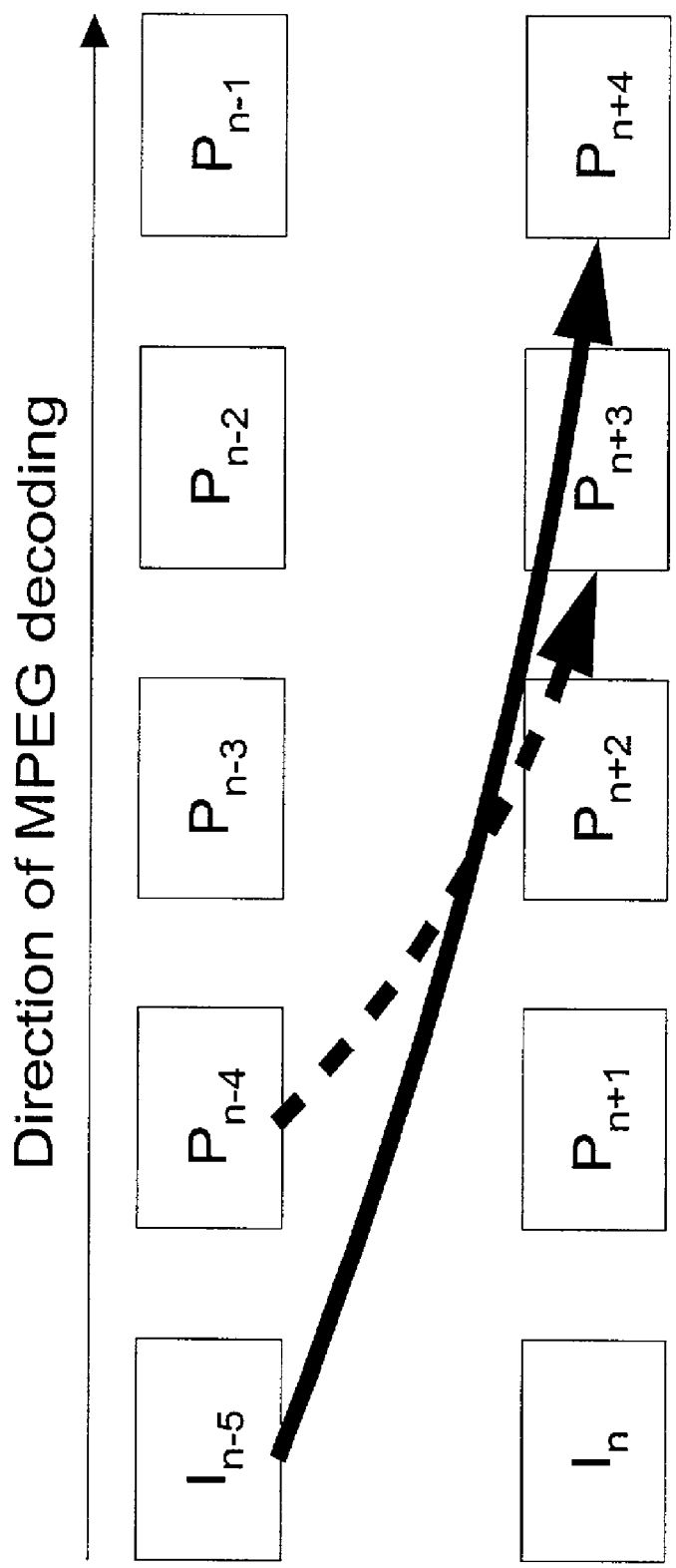
FIG. 7 illustrates decoding and storage of a subsequent (second) GOP.

FIG. 7 illustrates decoding and storage of a subsequent (second) GOP to be temporally reversed. As discussed above, it is possible to display all the I and P-frames in reverse order by storing the decoded frames in the GA 60's memory. The GA 60 has sufficient memory to hold 5 decoded images. In such a case, and referring to FIG. 7, the sequence of I and P-frames for first and second GOPs to be displayed in reverse are as follows: $I_{n-5}$ $P_{n-4}$ $P_{n-3}$ $P_{n-2}$ $P_{n-1}$ (second GOP to be played back) and $I_n$ $P_{n+1}$ $P_{n+2}$ $P_{n+3}$ $P_{n+4}$ (first GOP to be played back, where both GOPs above are illustrated in their storage and decode order).

The decoded frames are decoded and stored in the GA 60's memory in the following order: $I_n$ $P_{n+1}$ $P_{n+2}$ $P_{n+3}$ $P_{n+4}$. The reverse playback will be executed by displaying the images in the GA 60's memory in the following sequence: $P_{n+4}$ $P_{n+3}$ $P_{n+2}$ $P_{n+1}$ $I_n$. In other words, the temporal reversal is performed in the GA 60's memory, SDRAM 62, under the control of memory I/F 64. As described above, memory I/F 64 controls access to a display memory portion in SDRAM 62, informing the incoming video frames where they are to be stored in SDRAM 62. Additionally, memory I/F 64 selects the decoded frames (which are being stored in SDRAM 62) that are going to be output to graphics engine 66 in temporally reversed order from SDRAM 62, to be eventually displayed (after encoding in encoder 68) on display device 70 when reverse playback is initiated by the viewer.

Figure 8:
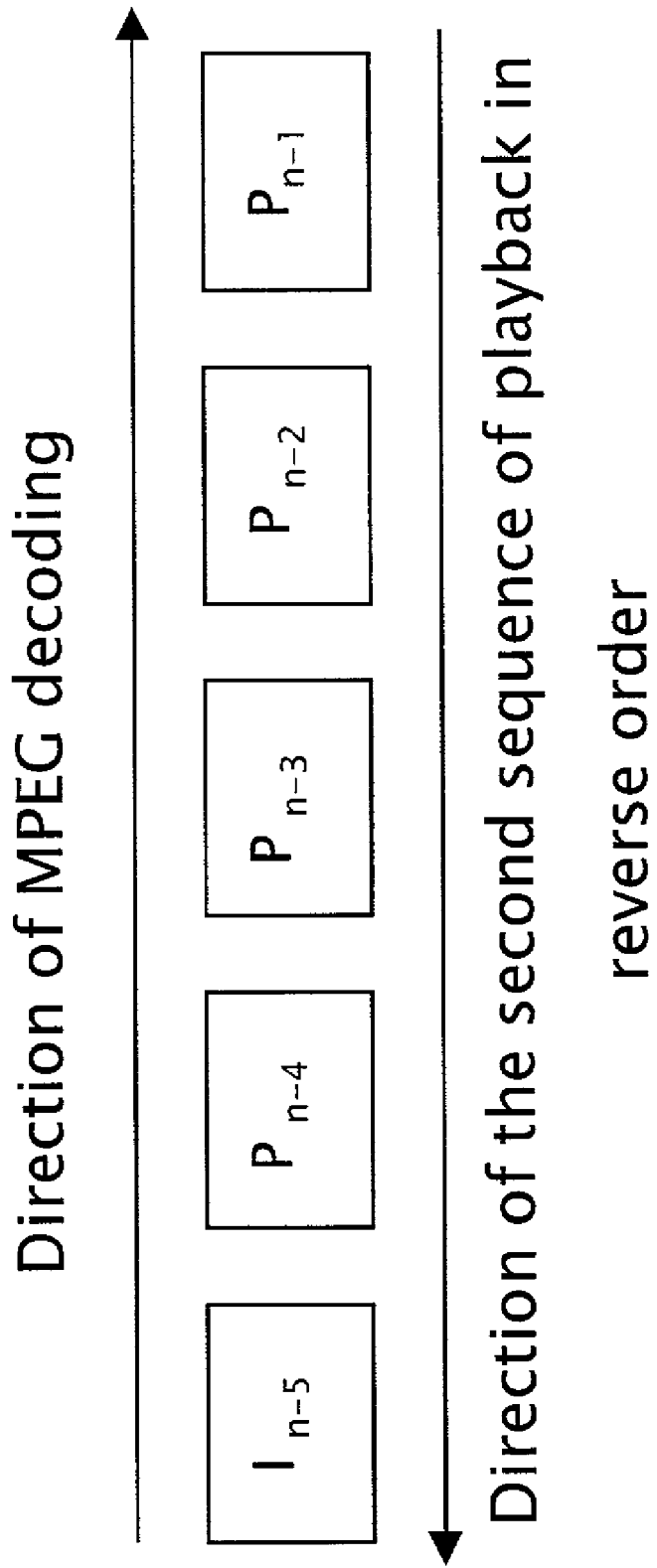
FIG. 8 illustrates the reverse playback field (frame) management for the second or subsequent GOP according to an exemplary embodiment of the invention.

FIG. 8 illustrates the reverse playback field (frame) management for the next (second) GOP to be displayed. Here, the MPEG A/V decoder 52 would be required to decode one frame in one frame time. Once the second GOP is decoded and stored in the GA 60's memory, playback of the second GOP is accomplished by displaying the frame buffers in the opposite order of the first GOP.

In operation, while $P_{n+4}$ $P_{n+3}$ $P_{n+2}$ $P_{n+1}$ $I_n$ are displayed in their sequentially reversed order after temporal reversal in GA 60, the MPEG A/V decoder 52 simultaneously decodes the next (second) GOP's images. Thus, $I_{n-5}$ $P_{n-4}$ $P_{n-3}$ $P_{n-2}$ $P_{n-1}$ of the second GOP are decoded by MPEG A/V decoder 52 at the same time that $P_{n+4}$ $P_{n+3}$ $P_{n+2}$ $P_{n+1}$ $I_n$ of the first GOP are being displayed via GA 60 on display device 70.

This means that the MPEG A/V decoder 52 is always working one GOP ahead of GA 60. As one frame of a given GOP is decoded by MPEG A/V decoder 52, one frame of the previously decoded (yet temporally in the future) GOP is displayed by GA 60.

More particularly, once $P_{n+4}$ is displayed, this frame (or field) buffer is reused immediately to store $I_{n-5}$ of the following second GOP. Therefore the MPEG A/V decoder 52 need only decode one frame in one frame time, which provides for a 3x playback. In fact, reverse playback may be possible up to Nx times, where $N=i_B+1$, or the number of intervening B frames (i.e., those B frames between I and P frames and/or P and P frames) in a GOP plus 1. As an example, in a GOP having 4 intervening B-frames, a reverse playback of up to 5x is possible. To achieve this speedup to Nx times, the B frames are dropped prior to being input to the MPEG decoder 52 (i.e., of the data stream being accessed from the HDD 20 to be sent to MPEG decoder 52, only I and P frame data are forwarded, B-frame data is not forwarded to MPEG decoder 52). The B-frame data is ignored in the temporal reversing process within GA 60. Thus, only the I and P frames are played back in reverse.

The above method of reverse playback has been described in conjunction with using a graphics accelerator and its associated SDRAM, the ability to reverse playback I, P and B-frames is not limited to a apparatus having a graphics accelerator. Alternatively, the system may be configured to have sufficient space available in memory so that it would not require the memory of the graphics accelerator to store the decoded MPEG video frames. In either configuration (using additional memory or graphics accelerator), reverse playback may be effectuated with a much finer temporal granularity than what is currently attainable by conventional video recording apparatuses.

The same method of reverse playback may be accomplished by including additional memory of about X Mbytes, where $X=(n_I+mp)*buff_{size}$ (MByte), or the number of I and P-frames in a GOP times $buff_{size}$, where buffsize is the image size in pixels (i.e. 720×480 pixels, 544×480 pixels, etc.) times the bit depth of the decoded image (for MPEG this may be an 8 bit/pixel or 10 bit/pixel bit depth, although the invention is not limited to these bit depths). In an exemplary embodiment, buffsize is equal to about 0.5 MByte. As an example, an MPEG decoder having this size memory may suffice, and/or the incorporation of an SDRAM or plurality of SDRAMs, arranged between the MPEG decoder and the display device, for temporally reversing the frames prior to display on display device 70. Similar to the previous embodiment, the additional memory requires a memory interface 64 and an encoder 68 (i.e., an NTSC/PAL/SECAM encoder) to perform the temporal reverse functions and conversion to analog needed to display the frames.

The invention being thus described, it will be obvious that the same may be varied in many ways. For example, as briefly discussed above the GA 60 may store fields instead of frames. There are two reasons for this. One, storing fields in lieu of frames represents a 50% savings in terms of memory consumption. Two, storing fields instead of frames eliminates interfield jitter. Thus, the invention can be applied to both field and frame-based reverse playback within GA 60.

Additionally, it should be noted that a 1x reverse playback of all frames (I, P and B) of the original broadcast is possible by allocating additional frame (or field) buffers in the GA 60's memory. Such buffers could be embodied by an SDRAM for example, or any other known or future developed memory technology. Thus, the same techniques described above could be applied in a similar manner in order to playback each B frame in a GOP, in addition to the aforementioned I and P-frames. In this case, the startup delay during playback is expressed by $t_{st=(n_I+m_{P+IB})}*FT$ (sec), where $(n_I+m_P+I_B)$ is equal to the number of I, P and B-frames in a GOP, times the frame time FT, which in the exemplary case is about 1/30 seconds.

Further, the present invention is not limited to MPEG configurations of I, P and B frames, but may be applicable to any system utilizing coded frames, temporally forward predictive frames and bi-directionally predictive frames to convey image data from an image source or subject to downstream processing and display. Such variations are not to be regarded as departure from the spirit and scope of the invention, and all such modifications as would be obvious to one skilled in the art are intended to be included within the scope of the following claims.

What is claimed is:

1. An apparatus for performing reverse playback of digitally recorded coded audiovisual data, comprising:
   a transport processor to receive coded audiovisual data from an input port:
   a first memory operatively connected to the transport processor and to receive the coded audiovisual data from the transport processor;
   a second memory operatively connected to a bus for digitally recording the coded audiovisual data;
   a host processor operatively coupled to the first memory and the second memory, wherein the host processor is configured to transfer the coded audiovisual data from the first memory to the second memory;
   a decoder coupled to the bus for receiving and decoding a portion of the digitally recorded coded audiovisual data rom the second memory, the decoder including an associated decoder memory, wherein the decoder stores the decoded portion in the decoder memory and outputs the decoded portion in a non-reversed order; and
   a graphics accelerator processor operatively connected to said bus and to the decoder, the graphics accelerator processor including an associated graphics accelerator memory, wherein the graphics accelerator processor receives the decoded portion in the non-reversed order and writes the decoded portion in the non-reversed order to the graphics accelerator memory, and wherein the graphics accelerator processor in response to a command reads the decoded portion from the graphics accelerator memory in a reversed order for reproduction as a displayed reverse playback of the portion of the digitally recorded coded audiovisual data.

2. The apparatus according to claim 1, wherein the recording device includes at least one mass storage device.

3. The apparatus according to claim 1, wherein the host processor is configured to perform graphics-user interface and browser functions.

4. The apparatus according to claim 1, wherein said digitally recorded coded audiovisual data transferred to said decoder is further embodied as a plurality of frames composing, a group of pictures, GOP, such that said decoder receives successive GOPs to be played back, and wherein said graphics accelerator processor plays back a first GOP of said successive GOPs to be played back while said decoder decodes a second GOP of said successive GOPs to be played back.

5. The apparatus according to claim 4, wherein the frames within said successive GOPs that are played back in reverse are at least I-frames and P-frames.

6. The apparatus according to claim 4, wherein the frames within said successive GOPs that are played back in reverse are I-frames, P-frames and B-frames.

7. The apparatus according to claim 1, wherein said digitally recorded coded audiovisual data transferred from said interface to said decoder is further embodied as a plurality of frames composing a group of pictures, GOP, so that said decoder receives successive GOPs to be played back, and said graphics accelerator processor plays back a first GOP of said successive GOPs to be played back while said decoder decodes a second GOP of said successive GOPs to be played back.

8. The apparatus according to claim 7, wherein the frames within said successive GOPs that are played back in reverse arc at least I-frames and P-frames.

9. The apparatus according to claim 8, wherein a delay of about t seconds is inserted at the beginning of the displayed reverse playback, and
wherein t=(nI+mP)*FT(sec), (nI+mP) being equal to the number of I and P-frames in a GOP, and FT being the frame time.

10. The apparatus according to claim 7, wherein the frames within said successive GOPs that are played back in reverse are I-frames, P-frames and B-frames.

11. The apparatus according to claim 10, wherein a delay of about t seconds is inserted at the beginning of the displayed reverse playback, and
wherein t=(nI+mP+1B)*FT (sec), (nI+mP+1B) being equal to the number of I, P and B-frames in a GOP, and FT being the frame time.

12. The apparatus according to claim 1, wherein a preset delay is inserted at the beginning of the displayed reverse playback.

13. The apparatus according to claim 1, wherein the graphics accelerator processor further includes:
a graphics engine for performing graphics processing on decoded audiovisual data input from said decoder to prepare the data for display;
a butter memory for temporarily storing the decoded audiovisual data;
a memory interface for communicating with said graphics engine and said buffer for directing the decoded audiovisual data to a storage location in said buffer, and for instructing said buffer to output selected audiovisual data to said graphics engine in said temporally reversed decoded order for graphics processing; and
an encoder for encoding the processed and temporally-reversed audiovisual data for reverse playback display.

14. The apparatus of claim 1, wherein said digitally recorded coded audiovisual data to be played back in reverse is embodied as a plurality of group of pictures, GOP, the GOP consisting of I-frames, P-frames and B-frames, and
wherein reverse playback being achievable up to N times, where N equals the number of B-frames intervening between I and P and/or successive P frames in the GOP plus 1.

15. The apparatus of claim 14, wherein playback up to N times is achievable by forwarding only data of the I and P frames to the decoder, data of the B-frames being dropped prior to decoding.

16. A method of reverse playback for digitally recorded coded audiovisual data, comprising:
receiving at a transport processor coded audiovisual data from an input port;
receiving at a first memory the coded audiovisual data from the transport processor;
transferring the coded audiovisual data from the first memory to a second memory that digitally records the coded audiovisual data;
transferring the digitally recorded audiovisual data from the second memory to a decoder;
receiving and decoding a portion of the digitally recorded coded audiovisual data;
storing the decoded portion in a decoder memory;
outputting the decoded portion in a non-reversed order to a graphics accelerator processor;
receiving at the graphics accelerator processor the decoded portion in the non-reversed order;
writing the decoded portion in the non-reversed order to a graphics accelerator memory;
receiving a command;
in response to the command the graphics accelerator processor reading the decoded portion from the graphics accelerator memory in a reversed order for reproduction as a displayed reverse playback of the portion of the digitally recorded coded audiovisual data, and
outputting said reversed order decoded audiovisual data for a displayed playback.

17. The method according to claim 16, wherein said step of transferring further includes transferring said digitally recorded coded audiovisual data from said memory to said decoder via a bus and an interface.

18. The method according to claim 16, wherein said digitally recorded coded audiovisual data transferred to said decoder is further embodied as a plurality of frames composing a group of pictures, GOP, such that said decoder receives successive GOPs to be played back, and wherein said step of temporally reversing includes reversing the decoded order of and playing back a first GOP of said successive GOPs simultaneous with decoding a second GOP of said successive GOPs.

19. The method according to claim 18, wherein the frames within said successive GOPs that are played back in reverse are at least I-frames and P-frames.

20. The method according to claim 19, further comprising inserting a delay of about t seconds prior to said step of outputting the displayed reverse playback, wherein t=(nI+mP)+FT(see), (nI+mP) being equal to the number of I and P-frames in a GOP, and FT being the frame time.

21. The method according to claim 18, wherein the frames within said successive GOPs that are played back in reverse are J-frames, P-frames and B-frames.

22. The method according to claim 21, further comprising inserting a delay of about t seconds prior to said step of outputting the displayed reverse playback, wherein t=(nI+mP+1B)*FT (sec), (nI+mP+1B) being equal to the number of I, P and B-frames in a GOP, and FT being the frame time.

23. The method according to claim 16, wherein said digitally recorded coded audiovisual data to be played back in reverse is embodied as a plurality of group of pictures, GOP, the GOP consisting of I-frames, P-frames and B-frames, and
wherein reverse playback is achievable up to N times, where N equals the number of intervening B-frames between I and P and/or successive P frames in the GOP plus 1.

24. The method of claim 23, wherein playback up to N times is achievable by forwarding only data of the I and P frames for decoding, data of the B-frames being dropped prior to decoding.

* * * * *